United States Patent
Böhm

(10) Patent No.: US 6,468,650 B1
(45) Date of Patent: Oct. 22, 2002

(54) ADHESIVE COMPOSITION AND SURFACE PROTECTION FILMS PRODUCED THEREWITH

(75) Inventor: Nicolai Böhm, Hamburg (DE)

(73) Assignee: tesa AG, Hamburg (DE)

( * ) Notice: Subject to any disclaimer, the term of this patent is extended or adjusted under 35 U.S.C. 154(b) by 145 days.

(21) Appl. No.: 09/709,863

(22) Filed: Nov. 10, 2000

(30) Foreign Application Priority Data

Nov. 13, 1999 (DE) .......................... 199 54 700

(51) Int. Cl.$^7$ .............................. B32B 27/30
(52) U.S. Cl. ................ 428/355 EN; 428/337; 428/515; 525/186
(58) Field of Search .................. 428/355 EN, 515, 428/337; 525/186

(56) References Cited

U.S. PATENT DOCUMENTS 4,172,173 A * 10/1979 Trapasso et al. ............ 428/288
5,925,456 A * 7/1999 Malek ........................ 428/332

* cited by examiner

Primary Examiner—Robert Dawson
Assistant Examiner—Christopher M. Keehan
(74) Attorney, Agent, or Firm—Norris McLaughlin & Marcus

(57) ABSTRACT

A self-adhesive composition, comprising a base polymer of polyethylene-vinyl acetate (EVA) having a vinyl acetate fraction of from 40 to 80% by weight and a melt index MFI in accordance with ISO 1133 (A/4) of from 0.5 to 25 g/10 min at 190° C. and 2.16 kg, which is blended with a polyether having a fraction of from 1 to 35% by weight of the form $$XO-[(CH_2)_4-O]-Y \qquad (1)$$

or $$XO-[(CH(CH_3)-CH_2-O]-Y \qquad (2)$$

having a weight-average molecular weight $M_w$ of from 200 to 100,000 g/mol, X and Y being selected from the group consisting of H—, $(C_nH_{2n+1})$— where n is from 1 to 20, $CH_2=CHCO-$, $CH_3CH(NH_2)CH_2-$, 2,3-epoxypropyl, $C_6H_5-CO-$, and $CH_2=C(CH_3)-CO-$.

8 Claims, No Drawings

ADHESIVE COMPOSITION AND SURFACE PROTECTION FILMS PRODUCED THEREWITH

The invention relates to an adhesive composition which is particularly suitable for use on protective films for glossy surfaces such as plastics, metals, glass and coating materials. This composition permits the production of long-lived surface protection films which are easy to unwind from the roll and which adhere reliably but may nevertheless be removed easily and without residue.

As well as its function, the commercial success of a product is nowadays also determined by its flawless appearance. An important design factor is the surface of the article, which is frequently decoratively polished or glossily coated or which for optical reasons must be free from scratches, such as glass surfaces in particular. In order to be able to sell the customer the product in flawless condition, therefore, surface protection is advantageous, particularly in the form of self-adhesive films. This method has become particularly well-established for a number of years in the automotive sector, where exposed paint surfaces such as the roof, engine hood and trunk lid are protected over large areas against environmental effects and mechanical damage using self-adhesive films.

The requirements imposed on a self-adhesive article applied over a large area are stringent. Thus, the film web must be able to be unwound easily from the roll without stretching. The requirements are for a sufficient initial bond strength and a final bond strength which should be achieved after a few days. If the film is exposed to outdoor weathering, a sufficient bond strength must be maintained even under high atmospheric humidity or even rain. The final bond strength must be balanced in such a way that the film is not detached by wind or slipstream but also does not require excessive effort to remove it. It must be detachable without deposit or residue and its light stability must be up to the task at hand. Moreover, the adhesive composition must not adversely affect the quality of the adhesion substrate being protected; such adverse effects are manifested in particular in irreversible deformations in the case of coating material.

The surface protection article must have a stretchability which allows ideally fold-free sticking even on curved surfaces. Especially in the case of transparent surface protection products, the article must be able to be applied to the surface without bubbles. An important component of these stringent requirements is critically influenced by the properties of the adhesive composition.

Frequent use is made of self-adhesive compositions based on polyisobutylene (PIB) or acrylate polymers. PIB has a very poor initial bond strength, which may lead to premature self-induced detachment, and also has only a very limited final bond strength. A particular observation with PIB is of "flaking effects", i.e., a sudden reduction in bond strength at high removal speeds, so that complete detachment may occur even on fluttering in the wind.

PIB-treated products may be the cause of traffic hazard situations owing to fully detached films which drift onto the windshield of following vehicles.

Acrylate polymers tend to detract in particular from painted surfaces, by flattening the high-gloss surface.

DE 196 35 704 A1 describes a self-adhesive surface protection film made from polyolefins with an adhesive comprising polyethylene vinyl acetate (EVA) with a vinyl acetate content of from 40 mol % to 80 mol %, especially 70 mol %, and with a loss angle tan δ of from 0.6 to 1.0, measured at a temperature of 60° C. and a frequency of $10^{-2}$ Hz, and from 0.4 to 0.7, measured at a temperature of 60° C. and a frequency of 10 Hz. EVA in the claimed form possesses good initial bond strength to paint and good paint compatibility. The high final bond strength to paints and glass surfaces, although it permits highly reliable bonding, nevertheless necessitates a disproportionately great effort when removing the film, which may adversely affect the health of persons for whom the demasking is a daily task. Moreover, because of the high bond strength, tearing during the demasking operation is a frequent occurrence, and means that the film cannot be removed in one piece.

A known technique for reducing bond strength is to incorporate fillers or plasticizers into the adhesive compositions. Examples of suitable fillers are chalk, zinc oxide or silicates. Although these effectively reduce the bond strength, they cause deterioration on the sensitive substrate surfaces: for example, matt areas on glossy paint surfaces. Plasticizers such as waxes, oils or low molecular mass rubbers likewise, it is true, alter the bonding characteristics. Especially at high temperatures, however, these plasticizers may be exuded and form deposits or may reduce the cohesiveness of the composition, which can lead to residues of composition, predominantly at the edges and in folds. A particular risk originates from the low molecular mass substances, which are able to diffuse into the surfaces and cause swelling therein or even have a discoloring effect following insolation (UV light exposure).

It is an object of the invention to provide a self-adhesive composition for surface protection films, and to provide films coated with the self-adhesive composition of the invention, which do not exhibit the above-described disadvantages of the prior art, or not to the same extent. In particular, the adhesive composition should possess not only a pronounced initial bond strength but also a balanced final bond strength which prevents the film from detaching as a result of wind, for example, while allowing the film to be removed without extraordinary effort.

This object is achieved by means of an adhesive composition as laid down in the main claim. The subclaims relate to advantageous developments of the adhesive composition and to the use of the adhesive composition on surface protection films.

The invention accordingly provides the formulation of a self-adhesive composition for a surface protection, comprising a base polymer of polyethylene-vinyl acetate (EVA) having a vinyl acetate fraction of from 40 to 80% by weight and a melt index MFI in accordance with ISO 1133 (AN/4) of from 0.5 to 25 g/10 min at 190° C. and 2.16 kg, which is blended with a polyether having a fraction of from 1 to 35% by weight of the form

  (1)

or

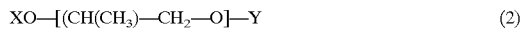  (2)

having a weight-average molecular weight $M_w$ of from 200 to 100,000 g/mol, X and Y being selected from the group consisting of H—, $(C_nH_{2n+1})$— where n is from 1 to 20, $CH_2$=CHCO—, $CH_3CH(NH_2)CH_2$—, 2,3-epoxypropyl, $C_6H_5$—CO—, and $CH_2$=C($CH_3$)—CO—.

In one preferred embodiment, the adhesive composition is made up as follows:

from 65 to 98% by weight, preferably from 75 to 95% by weight, of EVA,
where the EVA may in particular have a VA fraction of from 40 to 80% by weight, preferably from 50 to 65% by weight, and a melt index MFI of from 0.5 to 25 g/10 min at 190° C. and 2.16 kg, preferably from 1 to 5 g/10 min at 190° C. and 2.16 kg, or mixtures of different EVA grades within these limits, and from 2 to 35% by weight, preferably from 5 to 20% by weight, of a polyether of type (1) or (2) having a weight-average molecular weight $M_w$ of from 200 to 100,000 g/mol, preferably from 1000 to 20,000 g/mol.

The EVA in the form described forms the polymer framework of the adhesive composition, with a moderately pronounced tack on polished and/or glossy metal, a plastics, glass and paint surfaces and a rapidly increasing bond strength thereon, which attains its ultimate value within a few days, this value being achieved more quickly under the action of heat.

Since the polymer framework in question is chemically uncrosslinked, and on the basis of its monomer proportion is only very slightly crystalline, the molecular weight, which correlates directly to the MFI, assumes a decisive position With regard to the cohesiveness of the adhesive composition. An MFI of from 1 to 5 has proven to be a favorable value. The addition of an EVA fraction having an MFI of up to 25, however, may contribute to improving the flow properties if the adhesive composition is to be applied from the melt or coextruded together with a backing.

The addition of polyethers described has the effect of reducing bond strength at the same time as maintaining the required initial tack, the aging stability, the health and environmental acceptability, the lack of discoloration even of white substrates, and the freedom of the overstuck surfaces from deposits after demasking. Depending on the sensitivity of the surfaces to be protected, different molecular masses are found to be suitable for preventing inward migration and, in association therewith, swelling, especially of plastic and paint surfaces.

There is also a marked reduction in the unwind behavior of the protective films produced using this adhesive composition and wound- up into rolls, relative to a straight EVA composition. Depending on the fraction of the added polyether, the bond strength reducing effect may be regulated steplessly.

With particular advantage, the self-adhesive composition of the invention may be used on backing materials such as films, so resulting in an outstanding surface protection film.

The adhesive composition may be processed either from solution or from the melt, i.e., as a hot-melt, or by coextrusion. From 12 to 30 g/m² is an advantageous application rate. It ensures a sufficient cushion of composition for said composition to flow out flush with the surface, and exhibits the best compatibility with sensitive surfaces without there being any notable residues of composition.

Very particular suitability for surface protection is provided by unoriented films, which have sufficient flexibility to be able to be bonded virtually without folds even to curved surfaces. Particularly suitable polymers are polyethylene, polypropylene, propylene-ethylene copolymers or mixtures thereof.

These polymers require UV stabilization in order to ensure long life, in a manner compatible with the application, when the film is exposed to outdoor weathering. Particularly suitable for this purpose are HALS light stabilizers such as, for example, dimethyl succinate polymer with 4-hydroxy-2,2,6,6-tetramethyl-1-piperidinoethanol (CAS No. 65447-77-0), bis(2,2,6,6-tetramethyl-4-piperidinyl) sebacate (CAS No. 52829-07-9) or poly[[6-[(1,1,3,3-tetramethylbutyl)amino]-1,3,5-triazine-2,4-diyl][[(2,2,6,6-tetramethyl-4-piperidyl)imino]hexamethylene[(2,2,6,6-tetramethyl-4-piperidyl)imino]] (CAS No. 70624-18-9). The amount of the light stabilizer should be at least 0.15% by weight, preferably at least 0.30% by weight, based on the backing film.

Additional light protection is achieved by mean; of fillers such as titanium dioxide, which thus additionally gives the film a white coloration which is frequently desirable in the case of nontransparent surfaces. To protect transparent surfaces such as automobile windows, for example, the film should in contrast be glass-clear, so that it is still possible to look through the protected window. In this case, pigments and fillers are ruled out.

The adhesive composition of the invention must be anchored to PO films by means of appropriate primers, suitability being possessed in particular by EVA types having a VA fraction of from 20 to 30% by weight. Corona pretreatment is also effective for the case where coating takes place from solution.

Although the adhesive composition of the invention possesses a reduced bond strength on its own rear face relative to a straight EVA adhesive composition, for greater ease of unwinding, especially of very wide surface protection products in the form of rolls of up to 2 m in width, an additional release coating may be advantageous, whose effective constituents may, for example, be silicones or waxes. Otherwise, irreversible stretching may occur even during the unwinding of the film, which is deliberately designed to be stretchable.

The adhesive composition of the invention is described below in preferred embodiment on the basis of a number of utility examples of surface protection films, without wishing thereby to restrict the invention in any way whatsoever. Also given are two comparative examples in which inappropriate adhesive compositions and surface protection films produced from them are depicted.

EXAMPLES

Example 1

A 65 µm thick film comprising a 50 µm thick layer comprising 55 parts by weight of polyethylene, of which 40 parts by weight comprise high-impact polyethylene, 35 parts by weight of polypropylene, 10 parts by weight of $TiO_2$ batch and 0.5 part by weight of HALS light stabilizers and a 15 µm thick layer having a primer comprising 70 parts by weight of polyethylene-vinyl acetate with a 28% by weight vinyl acetate fraction and 30 parts by weight of polyethylene was coated with a solution of 90 parts by weight of polyethylene-vinyl acetate with a 50% by weight vinyl acetate fraction and 10 parts by weight of poly-THF 2900 (BASF, Ludwigshafen, Germany) such that drying resulted in a white surface protection film with a total thickness of 85 μm. This film was wound into a roll.

The adhesion properties are set out below:

| Parameter* | Measured value, N/cm |
|---|---|
| Bond strength on steel | 0.1 |
| Bond strength on paint** after 30 min | 0.2 |
| Bond strength on paint** after 3 d at RT | 0.3 |
| Bond strength on paint** after 3 d at 90° C. | 2.0 |
| Peel force from the reverse after 1 m at 40° C. | 0.8 |

*at 300 mm/min, angle 180° (peel force 90°), 23° C. ± 1° C., 50% ± 5% relative humidity.
**1 K-PU clearcoat Duraclear II (BASF, Münster, Germany)

The film was unwindable from the roll without great effort or notable stretching and was able to be stuck with minimal folds on an engine hood with pronounced beads, as an example of a curved, painted surface.

The initial bond strength was sufficient, i.e., no flapping at the edges of the film was observed. Following storage of the engine hood at 90° C. for 3 days, the film was removable without great effort or tearing. It was impossible to induce any flaking effect, even by pulling sharply. At the edges, residues of composition caused by film shrinkage, were observed, about 1 mm in width.

In a test drive at speeds of up to 160 km/h, the film adhered reliably to the engine hood of the test vehicle.

Example 2

A 65 μm thick film comprising a 50 μm thick layer comprising 55 parts by weight of polyethylene, of which 40 parts by weight comprise high-impact polyethylene, 35 parts by weight of polypropylene, 10 parts by weight of $TiO_2$ batch and 0.5 part by weight of HALS light stabilizers and a 15 μm thick layer having a prirMer comprising 70 parts by weight of polyethylene-vinyl acetate with a 28% by weight vinyl acetate fraction and 30 parts by weight of polyethylene was coated with a solution of 92 parts by weight of polyethylene-vinyl acetate with a 50% by weight vinyl acetate fraction and 8 parts by weight of the polyether Arcol Polyol 1042 (Arco, Ghent, Belgium) such that drying resulted in a white surface protection film with a total thickness of 85 μm. This film was wound into a roll.

The adhesion properties are set out below:

| Parameter* | Measured value, N/cm |
|---|---|
| Bond strength on steel | 0.1 |
| Bond strength on paint** after 30 min | 0.3 |
| Bond strength on paint** after 3 d at RT | 0.5 |
| Bond strength on paint** after 3 d at 90° C. | 1.6 |
| Peel force from the reverse after 1 m at 40° C. | 0.7 |

*at 300 mm/min, angle 180° (peel force 90°), 23° C. ± 1° C., 50% ± 5% relative humidity.
**1 K-PU clearcoat Duraclear II (BASF, Münster, Germany)

The film was unwindable from the roll without great effort or notable stretching and was able to be stuck with minimal folds on an engine hood with pronounced beads, as an example of a curved, painted surface.

The initial bond strength was sufficient, i.e., no flapping at the edges of the film was observed. Following storage of the engine hood at 90° C. for 3 days, the film was removable without great effort or tearing. It was impossible to induce any flaking effect, even by pulling sharply. At the edges, residues of composition caused by film shrinkage, were observed, about 1 mm in width.

In a test drive at speeds of up to 160 km/h, the film adhered reliably to the engine hood of the test vehicle.

Example 3

A 55 μm thick film comprising a 45 μm thick layer comprising 100 parts by weight of a random propylene-ethylene copolymer and 1 part by weight of HALS light stabilizers and a 10 μm thick layer having a primer comprising 100 parts by weight of polyethylene-vinyl acetate with a 26% by weight vinyl acetate fraction was coated with a solution of 85 parts by weight of polyethylene-vinyl acetate with a 60% by weight vinyl acetate fraction and 15 parts by weight of poly-THF 1000 (BASF, Ludwigshafen, Germany) such that drying resulted in a transparent surface protection film with a total thickness of 70 μm. This film was wound tautly to a fold-free and bubble-free roll.

The adhesion properties are set out below:

| Parameter* | Measured value, N/cm |
|---|---|
| Bond strength on steel | 0.1 |
| Bond strength on glass after 30 min | 0.2 |
| Bond strength on glass after 3 d at RT | 0.6 |
| Bond strength on glass after 3 d at 90° C. | 1.3 |
| Peel force from the reverse after 1 m at 40° C. | 0.7 |

*at 300 mm/min, angle 180° (peel force 90°), 23° C. ± 1° C., 50% ± 5% relative humidity.

The film was unwindable from the roll without great effort, free from notable stretching, and smoothly, i.e., without creases, and was able to be stuck without folds onto a windshield of the Volkswagen Golf IV, as an example of a curved glass surface. The adhesive composition wetted the glass in such a way that only a very few air bubbles disrupting the view through the glass were included. These air bubbles had reduced still further after 24 hours. The overall visual impression of the overstuck window was highly satisfactory. The initial bond strength was sufficient, i.e., no flapping at the edges of the film was observed. Following storage of the windshield at 90° C. for 3 days, the film was removable without great effort or tearing. It was impossible to induce any flaking effect, even by pulling sharply. At the edges, residues of composition caused by film shrinkage, were observed, about 1 mm in width.

In a test drive at speeds of up to 160 km/h, the film adhered reliably to the windscreen of the test vehicle.

Comparative Example 4

A 65 μm thick film comprising a 50 μm thick layer comprising 55 parts by weight of polyethylene, of which 40 parts by weight comprise high-impact polyethylene, 35 parts by weight of polypropylene, 10 parts by weight of $TiO_2$ batch and 0.5 part by weight of HALS light stabilizers and a 15 μm thick layer having a primer comprising 70 parts by weight of is polyethylene-vinyl acetate with a 28% by weight vinyl acetate fraction and 30 parts by weight of polyethylene was coated with a solution of 70 parts by weight of polyethylene-vinyl acetate with a 70% by weight vinyl acetate fraction and 30 parts by weight of polyethylene-vinyl acetate with a 45% by weight vinyl acetate fraction such that drying resulted in a white surface protection film with a total thickness of 85 μm. This film was wound into a roll.

The adhesion properties are set out below:

| Parameter* | Measured value, N/cm |
|---|---|
| Bond strength on steel | 1.1 |
| Bond strength on paint** after 30 min | 0.4 |
| Bond strength on paint** after 3 d at RT | 0.9 |
| Bond strength on paint** after 3 d at 90° C. | 3.0 |
| Peel force from the reverse after 1 m at 40° C. | 1.2 |

*at 300 mm/min, angle 180° (peel force 90°), 23° C. ± 1° C., 50% ± 5% relative humidity.
**1 K-PU clearcoat Duraclear II (BASF, Münster, Germany)

The film was unwindable from the roll only with great application of force and considerable stretching at the points where it was grasped, but otherwise was able to be stuck with minimal folds on an engine hood with pronounced beads, as an example of a curved, painted surface.

The initial bond strength was sufficient, i.e., no flapping at the edges of the film was observed. Following storage of the engine hood at 90° C. for 3 days, the film was removable only with great effort and in some cases in sections. It was impossible to induce any flaking effect, even by pulling sharply. At the edges, residues of composition caused by film shrinkage, were observed, about 1 mm in width.

In a test drive at speeds of up to 160 km/h, the film adhered reliably to the engine hood of the test vehicle.

Comparative Example 5

A 55 μm thick film comprising 55 parts by weight of polyethylene, of which 40 parts by weight comprise high-impact polyethylene, 35 parts by weight of polypropylene, 10 parts by weight of $TiO_2$ batch and 0.5 part by weight of HALS light stabilizers was coated with the toluene solution of a mixture of polyisobutylenes of which 12 parts by weight had a weight-average molecular weight $M_w$ of 40,000 g/mol, 48 parts by weight had a weight-average molecular weight $M_w$ of 900,000 g/mol, and 40 parts by weight had a weight-average molecular weight $M_w$ of 4.7 million g/mol such that drying resulted in a white surface with a total thickness of 85 μm. The rear face was coated with a polyvinylstearyl-carbamate release coating. The product was wound into a roll.

The adhesion properties are set out below:

| Parameter* | Measured value, N/cm |
|---|---|
| Bond strength on steel | 0.8 |
| Bond strength on paint** after 30 min | 0.05 |
| Bond strength on paint** after 3 d at RT | 0.1 |
| Bond strength on paint** after 3 d at 90° C. | 0.8 |
| Peel force from the reverse after 1 m at 40° C. | 0.4 |

*at 300 mm/min, angle 180° (peel force 90°), 23° C. ± 1° C. 50% ± 5% relative humidity.
**1 K-PU clearcoat Duraclear II (BASF, Münster, Germany)
***coated with release coating The film was unwindable from the roll very easily and without stretching at the points where it was grasped, and was able to be stuck with minimal folds on an engine hood with pronounced grooves, as an example of a curved, painted surface.

The initial bond strength was not sufficient, i.e., flapping was observed in some cases at the edges of the film and the film was observed to pull away from the grooves. Following storage of the engine hood at 90° C. for 3 days, the film was very easy to remove since it flaked even at a moderate speed of removal. At the edges, residues of composition caused by film shrinkage, were observed, about 1 mm in width.

In a test drive at speeds of up to 160 km/h, the film detached over large areas, starting from small folds, in the region facing the slipstream.

What is claimed is:

1. A self-adhesive composition, comprising a base polymer of polyethylene-vinyl acetate (EVA) having a vinyl acetate fraction of from 40 to 80% by weight and a melt index MFI in accordance with ISO 1133 (A/4) of from 0.5 to 25 g/10 min at 190° C. and 2.16 kg, which is blended with a polyether having a fraction of from 1 to 35% by weight of the form $$XO-[(CH_2)_4-O]-Y \quad (1)$$

or $$XO-[(CH(CH_3)-CH_2-O]-Y \quad (2)$$

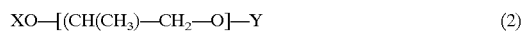

having a weight-average molecular weight $M_w$ of from 200 to 100,000 g/mol, X and Y being selected from the group consisting of H—, $(C_nH_{2n+1})$— where n is from 1 to 20, $CH_2$=CHCO—, $CH_3CH(NH_2)CH_2$—, 2,3-epoxypropyl, $C_6H_5$—CO—, and $CH_2$=$C(CH_3)$—CO—.

2. The self-adhesive composition as claimed in claim 1, which has the following composition:

from 65 to 98% by weight of EVA, where the EVA has a VA fraction of from 40 to 80% by weight, and a melt index MFI of from 0.5 to 25 g/10 min at 190° C. and 2.16 kg, or mixtures of different EVA grades within these limits, and from 2 to 35% by weight of a polyether of type (1) or (2) having a weight-average molecular weight $M_w$ of from 200 to 100,000 g/mol.

3. A backing material having applied thereto the self-adhesive composition according to claim 1 at an application rate of from 12 to 30 g/m².

4. A backing material according to claim 3, where the backing material is an unoriented film comprising polyethylene, polypropylene, propylene-ethylene copolymers or mixtures thereof.

5. Backing material according to claim 4 where light stabilizers are added to the films in an amount of at least 0.15% by weight based on the weight of the film.

6. Backing material of claim 4 where the film is blended with further additives.

7. Backing material of claim 4, further comprising a primer between the film and the self-adhesive composition.

8. Backing material according to claim 3 where the film has a release coating.

* * * * *